March 7, 1961  H. ALLEN  2,973,776
SNAP-ACTING PRESSURE RELIEF VALVE
Filed Feb. 20, 1959  3 Sheets-Sheet 1

Herbert Allen
INVENTOR.

BY Browning, Simms, Hyer & Eickenroht
ATTORNEYS

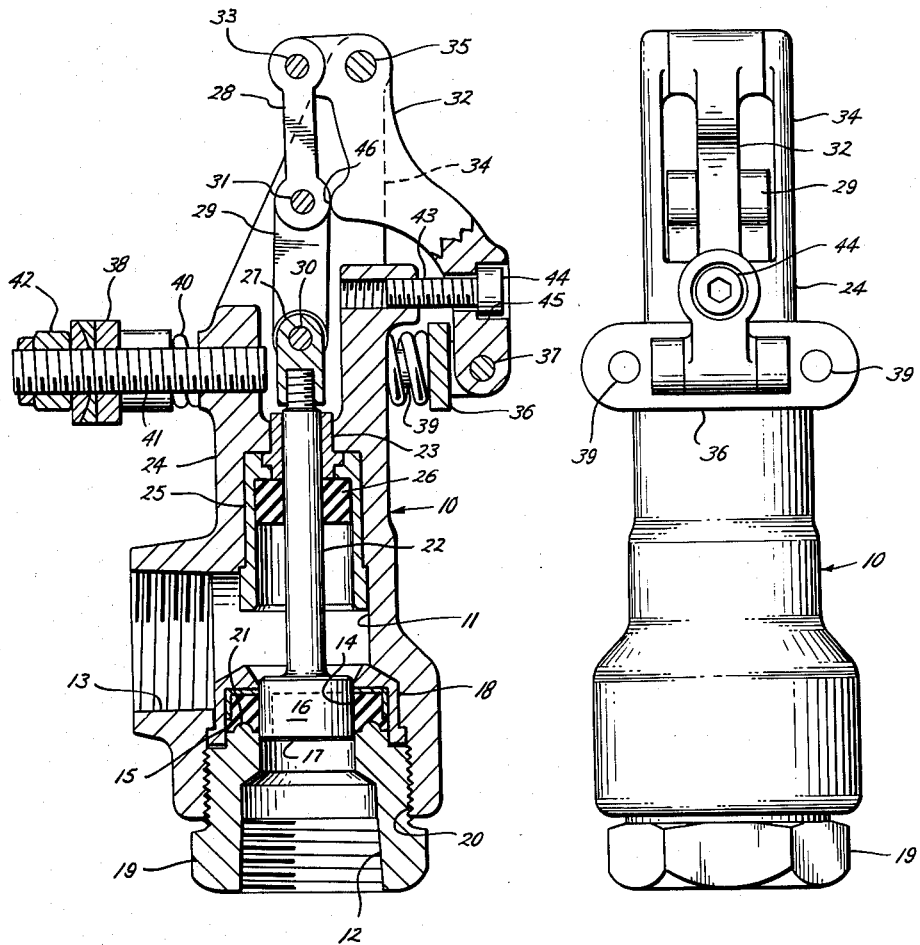

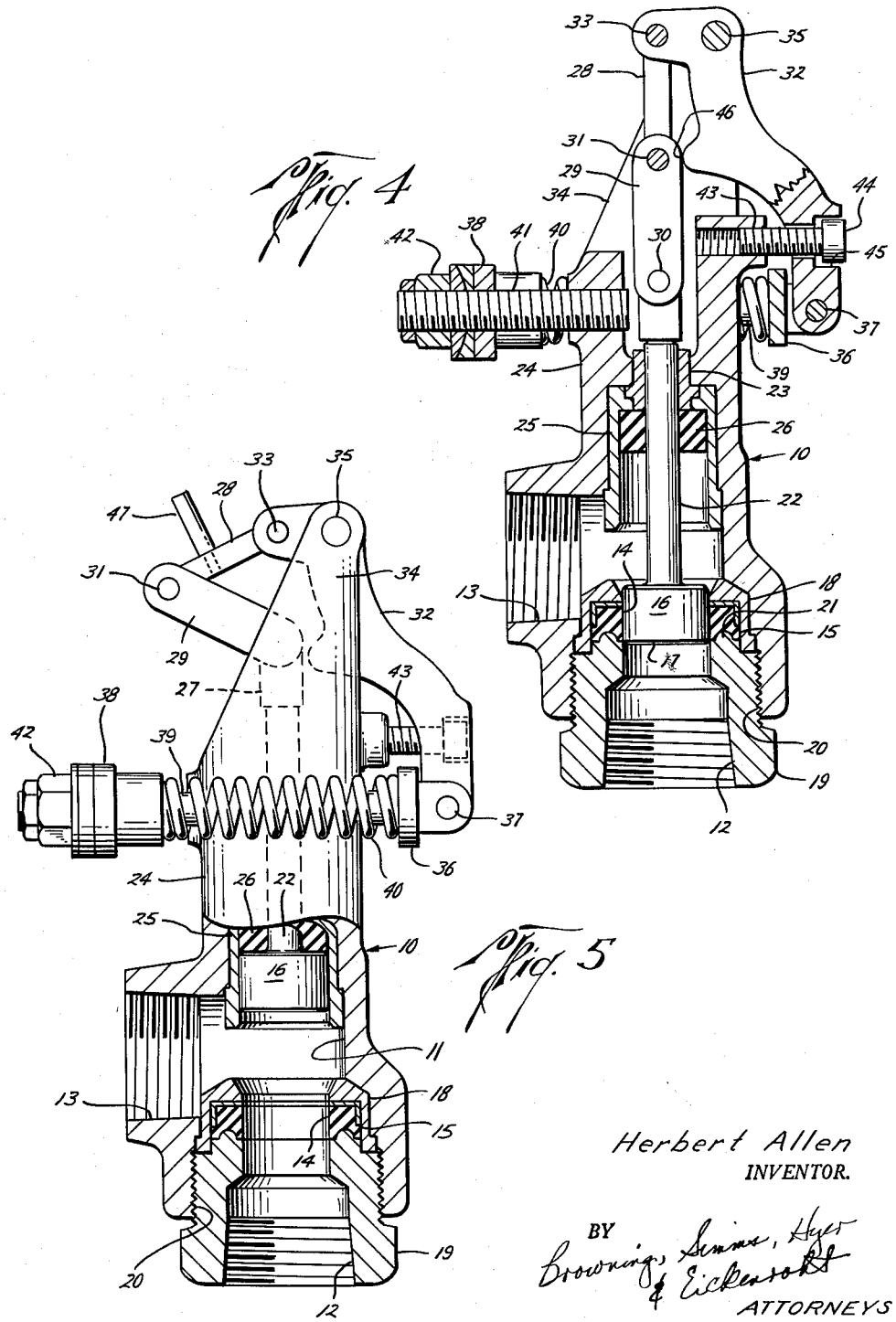

United States Patent Office 2,973,776
Patented Mar. 7, 1961

2,973,776

SNAP-ACTING PRESSURE RELIEF VALVE

Herbert Allen, Houston, Tex., assignor to Cameron Iron Works, Inc., Houston, Tex.

Filed Feb. 20, 1959, Ser. No. 794,696

14 Claims. (Cl. 137—467)

This invention relates generally to improvements in pressure relief valves of the type in which the force for holding the valve member closed is adapted to be decreased at a very rapid rate when line pressure reaches a predetermined value to be relieved, such that the valve member is moved to a fully open position despite the sudden drop in line pressure as it is initially unseated.

In one valve of this type, the force for resisting opening movement of the valve member is provided by one or more nails adapted to shear in response to the predetermined line pressure. However, when, in this particular valve as well as others of this general type, very high pressures are to be relieved, the force to be overcome requires a relief element which is too large for all practical purposes. Also, an expendable part, such as a nail, requires replacement each time the valve relieves, and the force which it provides is dependent on the material out of which it is made.

An object of this invention is to provide a pressure relief valve of this general type in which the force necessary to hold the valve member closed is relatively small in comparison to the force due to the pressure to be relieved.

Another object is to provide a pressure relief valve of this general type which does not require the replacement of an expendable relief element upon each operation.

Still another object is to provide a pressure relief valve of the type described which is reset after each operation with only a small amount of time and effort.

A further object is to provide such a pressure relief valve which is easily and quickly adjustable for relieving at any pressure over a wide range.

These and other objects are accomplished, in accordance with the present invention, by a pressure relief valve which comprises, as in prior valves of this type, a valve body having a flowway therethrough and a valve member which moves between positions opening and closing the flowway. The valve member has a pressure responsive surface exposed to the fluid within the flowway in the closed position thereof for urging it toward its open position.

An arm is pivotally mounted on the body for swinging in opposite directions and means are provided for yieldably urging it in one of said directions. This arm is connected to the valve member by a pair of pivotally connected links and means are provided for locating the links in a position with the axis of the pivotal connection therebetween to one side of an imaginary straight line through the axes of their connections to the arm and valve member. Thus, when the controlled pressure acts on the aforementioned surface of the valve member, the links transmit a force from the arm to the valve member due to the urging means which is effective to prevent movement of the valve member in an opening direction until the pressure of the fluid within the flowway reaches a predetermined value.

The last-mentioned means is responsive to initial movement of the valve member in an opening direction for moving the links to another position in which the axis of their pivotal connection is disposed on the other side of the imaginary straight line. This renders the links ineffective to transmit force from said arm to said valve member upon continued movement thereof in an opening direction so that the valve member is free to move quickly to a fully opened position.

More particularly, the arm is provided with a part for engaging one of the links to move them in the manner described, and the arm is urged to a limited position in said one direction. The movement of the links to said other position also permits the urging means to return the arm and the link engaging part thereto to positions in which the latter is adapted to locate the links in said first-mentioned position. Thus, the valve is reset merely upon such return of the links.

The distance from the pivotal connection of the arm to the body to the point of application of the force provided by the means yieldably urging the arm in said one direction is greater than to the connection thereof to the links. Thus, the valve member is held closed with a force which is relatively small in comparison to the force of the line fluid urging the valve member to one position.

The force with which the arm is urged is also adjustable so as to regulate the pressure which the valve will relieve. In one embodiment of the invention, a coil spring acts between the body and a point on the arm spaced from its pivotal connection with the body and the links, and means are provided for adjusting the compression or tension in the spring, as the case may be. On the other hand, in an alternate embodiment of the invention, a weight acts on the arm at a point spaced from the pivotal connection thereof with the body and links. The weight may be made up of separate parts which are added or subtracted in order to vary the effective force thereby. On the other hand, the weight may be moved longitudinally of the arm for varying its effectiveness.

The arm is limited in its pivotal movement in one direction by means which is adjustable to regulate the distance which the links are moved from the first-mentioned position to an aligned position in which the pivotal connection therebetween lies within the straight line between the axes of their pivotal connections with the arm and valve member. This adjustment determines the extent of movement of the valve member in an opening direction necessary to so move the links from their first-mentioned to their other position thereby rendering the force resisting such force ineffective.

Under most circumstances, if the valve member were unseated as it first began its movement in an opening direction, the venting of the pressure contained and thus the reduction in force on the valve member would be serious enough to prevent the valve member from moving a distance sufficient to move the links past their aligned position. Therefore, in the preferred form of the invention, the valve member maintains sealing contact with its seat in the valve body during the initial movement thereof necessary to so move the links.

It is further preferred that the valve member be movable in a closing direction relative to the seat from the closed position it occupies in the first-mentioned position of the links. In this manner, as the links are returned to their first-mentioned position, they do not have to work against the force of the yieldable urging means.

In the drawings, wherein like reference characters are used throughout to designate like parts:

Fig. 2 is a longitudinal sectional view of the valve of Fig. 1;

Fig. 3 is an elevational view thereof as seen from the right-hand side of Fig. 2;

Fig. 4 is a view similar to Fig. 2, but in which the valve member has begun to move to open position and just before the links are moved over-center;

Fig. 5 is a view similar to Figs. 2 and 4, but in which the links have collapsed to permit the valve member to move to fully opened position.

Figures 1, 6:
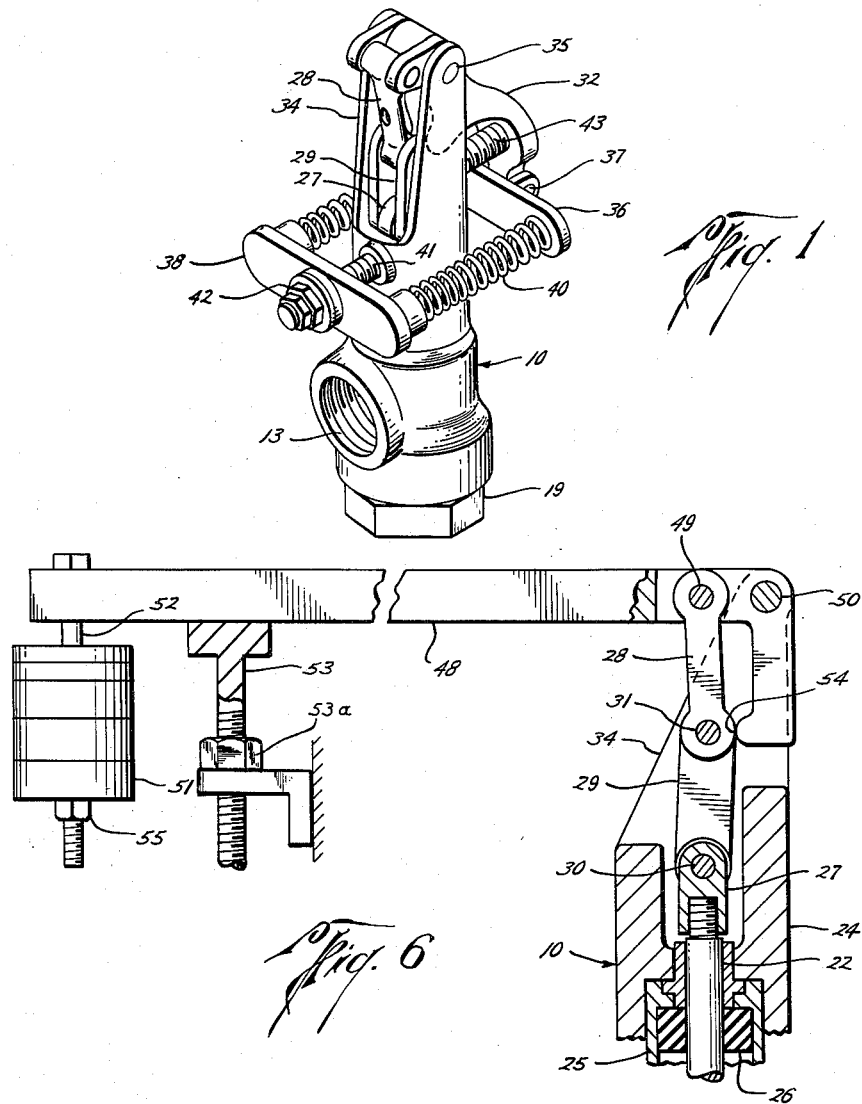
Fig. 1 is a perspective view of the first-mentioned embodiment of the invention in the closed position thereof.
Fig. 6 is an elevational view, partly in section, of the other embodiment of the invention in the closed position thereof.

Referring now in more detail to the above-described drawings, the embodiment shown in Figs. 1 to 5 comprises a valve body 10 having a flowway 11 therethrough and an inlet 12 to the flowway and an outlet 13 therefrom formed at approximately right angles to one another. A seat 14 on the flowway intermediate the inlet and outlet is defined by the inner periphery of an annular seal ring 15 of rubber or other suitable resilient material. A valve member 16 is movable in the valve body between a position within the seal ring to close the flowway, as shown in Figs. 2 and 4, and another position above the seal ring to open the flowway, as shown in Fig. 5. Obviously, the pressure of the fluid within the inlet 12 acts upon the lower surface 17 of the valve member to urge it toward its open position. It is also apparent that the pressure of this fluid will drop suddenly just as soon as the valve member is unseated.

The seal ring 15 is removably held in place between a ring 18 abuttable with a counterbored portion of the body and a nut 19 threaded at 20 into the end of the main portion of the body. An annular bead 21 on the nut 19 expands the lower end of the ring which is energized by the fluid in the inlet into sealing engagement with the valve member 16 during movement of the valve member within the ring.

The valve member is carried on the lower end of a stem 22 which is slidably received within a bearing 23 in a tubular extension 24 of the body. This bearing is held in place by means of a sleeve 25 fitted within the extension 24, and an annular ring 26 of rubber or other suitable material is received and held within the sleeve to surround the stem 22 and engage the upper end of the valve member as it opens to cushion the shock thereof. It is apparent from the drawings that these parts are also replaceable through the counterbored portion of the body upon removal of ring 18 and nut 19.

The upper end of the stem 22 projects above the bearing 23 for threaded connection with a head 27 which is pivotally connected to the lower of links 28 and 29 by means of a pin 30. The upper link 28 is pivotally connected at one end to the pair of identical lower links 29 by means of a pin 31 and at its other end to one end of an arm 32 by means of a pin 33 fixed to the link. Thus, when the links are held in a rigid angular position with respect to one another, as will be apparent from the description to follow, they form a compression force-transmitting connection between the arm 32 and the valve member 16. In the embodiments shown, the pivotal connection of the links to the valve member is direct, although it should be understood that such connection may be indirect, as by means of a chamber of hydraulic fluid, such as shown in my copending application, Serial No. 741,636, filed June 12, 1958, or other means for transmitting movement between the valve member and the links.

The arm 32 is pivotally mounted upon a yoke 34 above the portion 24 of the valve body by means of pins 35. The end of the arm opposite the end pivotally connected to the upper link 28 is pivotally connected to a bar 36 by means of a pin 37. Compression coil springs 40 are supported at opposite ends by means of projections 39 on the bar 36 as well as another bar 38 on the other side of the portion 24 of the body to act between the bars. The leftmost bar 38 is held in fixed position with respect to the body by means of a threaded rod 41 connected at its inner end to the body and receiving a nut 42 at its outer end for bearing on the outer side of the bar 38. Thus, the compression coil springs urge the bar 36 in a rightward direction to thereby urge the arm 32 in a counterclockwise pivotal direction. Also, the position of the nut 42 along the rod may be adjusted in an obvious manner in order to regulate the force with which the arm is urged.

This swinging of the arm 32 in a clockwise direction is limited by means of a bolt 43 throadedly connected to portion 24 of the body at its inner end and having an enlarged head 44 at its outer end engageable with a shoulder on a recess 45 formed in the arm. This arm is also provided with a part 46 whcih projects from the inner side thereof to engage the links 29 in the closed position of the valve member 16 shown in Fig. 2. More particularly, the part 46 engages one of the links to locate them in a position with the axis of the pin 31 to the right side of an imaginary straight line through the axes of pins 30 and 33.

As previously mentioned, the links thus form a compression force-transmitting connection between the arm 32 and valve member 16 which maintains the valve closed until the pressure of the fluid within inlet 12 reaches a predetermined value. That is, the valve member will remain in the closed position of Fig. 2 until the force of the fluid acting on the face 17 thereof overcomes the effective force of the spring 40 acting on the upper end of the links 28 and 29 through the axis of pin 33.

When this condition occurs, however, and the valve member begins to move upwardly, the force-transmitting connection provided by the links 28 and 29 will also move the links and pin 33 upwardly, as can be seen from a comparison of Figs. 2 and 4. This swings the arm 32 in a clockwise direction against the urging of springs 40 and causes the part 46 thereon to move inwardly or to the left while bearing upon one of the links. Consequently, concurrently with movement of the valve member in an opening direction, the links are moved to the left toward an aligned position in which the axis of pin 31 lies in the aforementioned straight line between the axes of pins 30 and 33.

During such movement, the valve member will occupy a position intermediate that shown in Figs. 2 and 4 so that it maintains sealing engagement with the seating surface 14. Thus, there is no venting of the contained fluid in the inlet 12 and the force acting on the lower surface 17 of the valve member 16 continues to move it upwardly.

However, as the links reach the aligned position shown in Fig. 4 and are then moved to the other position in which the axis of their pivotal connection is disposed on the left side of the aforementioned imaginary straight line, they will no longer be effective to transmit compressive force from the arm to the valve member upon continued movement of the valve member in an opening direction. Consequently, the arms readily collapse to the left side of their aligned position and the valve member is permitted to move upward at a rapid speed as it rises above the seating surface 14, thereby accomplishing one of the major objects of the present invention. This opening movement of the valve member continues until it engages the cushion 26 and the links are collapsed to the position of Fig. 5.

As can be seen from the drawings, the distance between the axes of the pins 33 and 35 is considerably less than the distance between the axes of the pins 35 and 37. Since the effective force of the spring 40 which resists upward movement of the valve member is a multiple of the force due to line fluid as determined by the inverse ratio of these distances, the valve member may be held closed against high pressures by means of a coil spring of relatively small size.

It will also be noted that the pin 31 travels only a short distance from its Fig. 2 position to the aligned position of Fig. 4. This, in turn, reduces to a very small amount the distance which the valve member 16 must move upwardly in an opening direction before the links are rendered ineffective to transmit the force of springs 40 to the valve member. The extent of this movement of the links is adjusted by means of the threaded bolt 43 in an obvious manner.

The valve is reset for a subsequent relieving operation merely by returning the links 28 and 29 from the collapsed position of Fig. 5 to the located position of Fig. 2. As shown in Fig. 5, a handle 47 is removably received within an opening in the link 28 to provide a lever in facilitating this return movement. This handle is normally removed after the valve is reset to avoid injury to an operator upon a subsequent relieving operation.

In returning, the links will move through a position in which the axis of pin 31 is to the left of a line through the axes of pins 33 and 35 a distance corresponding to that of the axis of pin 31 to the right of this line in the Fig. 2 position. As it moves from this position to its aligned position, or in a closing direction, the valve member moves downwardly, within the seal ring 15. Thus, the links do not have to overcome the force of the springs 40, as they would if movement of the valve member in a closing direction were limited by the seat. As line fluid acts on the valve member to raise it, the links are moved from aligned to the located position of Fig. 2.

In the embodiment of the valve shown in Fig. 6, the body beneath the tubular portion 24 thereof, as well as the valve member for opening and closing the flowway through such body, may correspond to similar parts shown in the above-described embodiment. As will also be apparent from Fig. 6, the links 28 and 29 are connected to the upper end of the stem 22 of the valve member in a manner similar to that described.

It is also true of this second embodiment of the invention that the upper link 28 is pivotally connected to an arm 48 by means of a pin 49 and the arm is pivotally mounted on the yoke 34 of the body by means of a pin 50. More particularly, the arm 48 is urged to swing in a counterclockwise direction by means of a weight 51 suspended by a rod 52 or the like at a point spaced from the axis of pin 49. Also, means in the form of a stop 53 (which may be connected or fixed with respect to the valve body in a manner not shown) is provided for limiting the clockwise swinging of the arm, and a projection 54 on the arm is provided for engagement with one of the links to limit their collapsing movement to the right side of their aligned position in the closed position of the valve member.

Thus, as in the case of the previously described embodiment, the links 28 and 29 provide a compressive force-transmitting connection between the arm 48 and the valve member to prevent movement of the valve member in an opening direction until the pressure of line fluid in the inlet reaches a predetermined value. At that time, the force due to such fluid is sufficient to overcome the effective force of the weight 51 at the axis of pin 49 so that the valve member begins to move in an opening direction. This raises the pin 49 so as to swing the arm 48 in a clockwise direction against the urging of the weight 51 and move the part 54 inwardly or to the left so as to move the links toward their aligned position. Then, as the links move past their aligned position to the left side thereof, they are rendered ineffective to transmit the force from the arm to the valve member so that the valve member moves upwardly at a fast rate.

As the links move past the aligned position, the arm is permitted to swing counterclockwise under the influence of weight until it bears against the stop 53. It is thus returned to a position in which the part 54 thereon will locate the links in the Fig. 6 position. As in the case of the first-described embodiment, the links are not resisted in their return by the means for urging the arm in a counterclockwise direction, which in this case is the weight 51. Furthermore, the stop 53 is so located with respect to the arm as to require only a small amount of travel of the links in moving from the position of Fig. 6 to an aligned position.

As was also the case in the first-described embodiment of the invention, the embodiment of Fig. 6 comprises an apparatus in which high pressures may be contained with a weight of minimum size. Thus, the distance between the point of application of the weight 51 upon the arm and the axis of pin 50 is considerably greater than the distance between the axis of pins 49 and 50.

The vertical position of the stop 53 is adjustable by means of the nut 53a or other suitable means to provide the desired amount of travel of the links. Furthermore, the weight 51 is made up of a number of separate parts, as shown, so that parts may be added or subtracted to adjust its effective force. For this purpose, a nut 55 is received over the lower threaded end of the rod 52, as shown in Fig. 6. Alternatively, the weight may be moved longitudinally along the arm 48 to regulate its effectiveness.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pressure relief valve, comprising a valve body having a flowway therethrough, a valve member movable between positions opening and closing the flowway and having a pressure responsive surface exposed to the fluid within the flowway in the closed position thereof for urging the valve member toward its open position, an arm pivotally mounted on the body for swinging in opposite direction, means yieldably urging the arm in one of said directions, a pair of pivotally connected links pivotally connecting the arm to the valve member, and means for locating the links in a position with the axis of the pivotal connection therebetween to one side of an imaginary straight line between the axes of their pivotal connections with said arm and valve member for transmitting a force from the urging means to the valve member which is effective to prevent opening movement of the valve member, until the pressure of the fluid within the flowway reaches a predetermined value, and moving said links to another position in which the pivotal connection therebetween is disposed on the other side of said line, in response to the initial movement of the valve member in an opening direction, for rendering said links ineffective to transmit force from said urging means to said valve member upon continued opening movement thereof.

2. A valve of the character defined in claim 1, including means for adjusting the effective force of the urging means.

3. A valve of the character defined in claim 1, wherein said urging means comprises a coil spring acting between the body and a point on the arm spaced from its pivotal connection with the body and the links.

4. A valve of the character defined in claim 1, wherein said urging means comprises a weight acting on the arm 5. A pressure relief valve, comprising a valve body having a flowway therethrough, a valve member movable between positions opening and closing the flowway and having a pressure responsive surface exposed to the fluid within the flowway in the closed position thereof for urging the valve member toward its open position, an arm pivotally mounted on the body, a pair of pivotally connected links pivotally connecting the arm to the valve member, means for yieldably urging the arm in a pivotal direction to dispose the axis of the pivotal connection between the links to the side of an imaginary straight line between the axes of their pivotal connections with the arm and valve member, and means for locating the links in a position with the axis of their pivotal connection to one side of the line to provide a force-transmitting connection between the arm and valve member for maintaining said valve member in its closed position, until the pressure of the fluid within the flowway reaches a predetermined value, and responsive to initial movement of the valve member in an open direction for moving said links to another position in which the axis of their pivotal connection to one another is on the other side of said line to render said force-transmission ineffective upon continued opening movement of the valve member.

6. A valve of the character defined in claim 5, wherein the distance from the point of application of the urging means on the arm to the pivotal connection of the arm to the body is greater than to the connection thereof to the links.

7. A valve of the character defined in claim 5, wherein there is a seat about the flowway for maintaining a seal about said valve member when it is in closed position and during said initial movement thereof in an opening direction.

8. A valve of the character defined in claim 7, wherein said seat provides the valve member with freedom of movement in a closing direction from the flowway closing position it occupies in the first-mentioned position of the links.

9. A pressure relief valve, comprising a valve body having a flowway therethrough, a valve member movable between positions opening and closing the flowway and having a pressure responsive surface exposed to the fluid within the flowway in the closed position thereof for urging the valve member toward its open position, an arm pivotally mounted on the body, a pair of pivotally connected links pivotally connecting the arm to the valve member, means for yieldably urging the arm to a limited position in one pivotal direction, and means for locating the links in a position with the axis of the pivotal connection therebetween to one side of an imaginary straight line between the axes of their pivotal connections with said arm and valve member to provide a force-transmitting connection between the arm and valve member for maintaining said valve member in its closed position until the pressure of the fluid within the flowway reaches a predetermined value, said means including a part fixed to the arm for engaging the links to move them to another position in which the pivotal axis of the pivotal connection therebetween is disposed on the other side of said line, in response to initial opening movement of the valve member, to render said force-transmitting connection ineffective upon continued movement of the valve member in an opening direction, the return of said links to the one side of said line automatically returning the valve member to closed position and said part to its position for locating the links in said first-mentioned position.

10. A valve of the character defined in claim 9, wherein said valve body has a seat which seals with the valve member for maintaining the flowway closed during said initial movement of the valve member in an opening direction.

11. A valve of the character defined in claim 9, wherein said valve body has a seat which seals with the valve member in its closed position and provides for freedom of movement of the valve member relative to said seat in a closing direction from its closed position.

12. A pressure relief valve, comprising a valve body having a flowway therethrough, a valve member movable between positions opening and closing the flowway and having a pressure responsive surface exposed to the fluid within the flowway in the closed position thereof for urging the valve member toward its open position, an arm pivotally mounted on the body for swinging in opposite directions, a pair of pivotally connected links, one of said links being pivotally connected to the arm and the other to the valve member, means limiting swinging movement of the arm in one of said directions, means yieldably urging the arm in said one direction, a part on the arm for locating the links in a position with the axis of the pivotal connection therebetween to one side of an imaginary straight line through the axes of their pivotal connections with said arm and valve member to provide a force-transmitting connection which is effective to maintain the valve member in closed position until the pressure of the fluid within the flowway reaches a predetermined valve, said part being responsive to the initial movement of the valve member in an opening direction to move the links to another position in which the axis of the pivotal connection therebetween is on the other side of said line to render the force-transmitting connection ineffective.

13. A valve of the character defined in claim 12, including means for adjusting said limiting means to regulate the extent of movement of the links between said first-mentioned position and a position in which the axis of the pivotal connection therebetween is aligned with said imaginary straight line.

14. A valve of the character defined in claim 12, wherein said valve body has a seat comprising an annular sealing surface, and said valve member has an annular surface sealingly engageable with said seat surface during its initial movement in an opening direction and movable relative to said seat surface in a closing direction from the closed position it occupies in the first-mentioned position.

References Cited in the file of this patent

UNITED STATES PATENTS

| | | |
|---|---|---|
| 1,314,244 | Brand | Aug. 26, 1919 |
| 1,792,302 | Hilliard | Feb. 10, 1931 |

FOREIGN PATENTS

| | | |
|---|---|---|
| 160,533 | Australia | Jan. 12, 1955 |